United States Patent
Shibuya et al.

(10) Patent No.: US 12,498,436 B2
(45) Date of Patent: Dec. 16, 2025

(54) STATIC MAGNETIC FIELD MAGNET AND MRI APPARATUS

(71) Applicant: CANON MEDICAL SYSTEMS CORPORATION, Otawara (JP)

(72) Inventors: Takehiro Shibuya, Nasushiobara (JP); Hiromi Kawamoto, Yaita (JP); Sadanori Tomiha, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 176 days.

(21) Appl. No.: 18/457,490

(22) Filed: Aug. 29, 2023

(65) Prior Publication Data

US 2024/0077558 A1 Mar. 7, 2024

(30) Foreign Application Priority Data

Sep. 1, 2022 (JP) ................. 2022-139168

(51) Int. Cl.
*G01R 33/3815* (2006.01)
*G01R 33/385* (2006.01)

(52) U.S. Cl.
CPC ....... *G01R 33/3815* (2013.01); *G01R 33/385* (2013.01)

(58) Field of Classification Search
CPC ............. G01R 33/3815; G01R 33/385; G01R 33/3804; G01R 33/56518; G01R 33/3806; G01R 33/4215
See application file for complete search history.

(56) References Cited

U.S. PATENT DOCUMENTS

| | | | | |
|---|---|---|---|---|
| 4,694,663 A | * | 9/1987 | Miller | ............... G01R 33/3815 62/51.1 |
| 5,532,663 A | * | 7/1996 | Herd | ....................... H01F 6/00 505/879 |
| 6,131,396 A | * | 10/2000 | Duerr | ..................... H01Q 1/364 62/DIG. 13 |

FOREIGN PATENT DOCUMENTS

| | | | |
|---|---|---|---|
| JP | H0722231 A | * | 1/1995 |
| JP | 2011-200348 A | | 10/2011 |

* cited by examiner

*Primary Examiner* — Daniel R Miller
(74) *Attorney, Agent, or Firm* — Oblon, McClelland, Maier & Neustadt, L.L.P.

(57) ABSTRACT

A static magnetic field magnet according to any of embodiments includes: a superconducting coil generating a static magnetic field; and a radiation shield surrounding the superconducting coil. In the static magnetic field magnet, at least a surface on a gradient coil side of the radiation shield includes a peripheral portion that forms multiple concavity and/or convexity. Further, In the static magnetic field magnet, a shape of a cross-section perpendicular to a depth direction of each of the multiple concavity and/or convexity formed by the peripheral portion is polygonal or circular. It is preferable that the peripheral portion is configured to form the multiple concavity and/or convexity in a straight line.

10 Claims, 7 Drawing Sheets

LINE A-A SECTIONAL VIEW

LINE B-B SECTIONAL VIEW

STATIC MAGNETIC FIELD MAGNET AND MRI APPARATUS

CROSS-REFERENCE TO RELATED APPLICATION

This application is based upon and claims the benefit of priority from Japanese Patent Application No. 2022-139168, filed on Sep. 1, 2022, the entire contents of which are incorporated herein by reference.

FIELD

Disclosed Embodiments relate to a static magnetic field magnet and a magnetic resonance imaging (MRI) apparatus.

BACKGROUND

An MRI apparatus is an imaging apparatus that uses a radio frequency (RF) signal having the Larmor frequency for exciting nuclear spin of an object such as a patient placed in a static magnetic field generated by a static magnetic field magnet and reconstructs an image on the basis of magnetic resonance (MR) signals emitted from the object due to the excitation.

The static magnetic field magnet is provided with: an outer vacuum vessel; an inner helium vessel; and a radiation shield disposed between the helium vessel and the vacuum vessel, for example. The radiation shield is cooled by a refrigerator and thereby achieves a function of reducing evaporation amount of liquid helium in the helium vessel caused by radiation. The metal material of the radiation shield has characteristics of high electrical conductivity. Thus, there is a possibility that the radiation shield is damaged by: a large eddy current I which is caused by gradient-coil induced heating (GCIH) attributable to operation of the gradient coil; and electromagnetic force resulting from the eddy current I. Even if the radiation shield is not damaged, the radiation shield with insufficient rigidity may be deformed and contact the outer vacuum vessel or the inner helium vessel. In such a case, there is a possibility that the amount of heat entering the helium vessel increases and thereby the evaporation amount of the liquid helium in the helium vessel increases.

BRIEF DESCRIPTION OF THE DRAWINGS

Each of FIG. 3A

Each of FIG. 6A

DETAILED DESCRIPTION

Hereinbelow, embodiments of the present invention will be described by referring to the accompanying drawings.

A static magnetic field magnet according to any of embodiments includes: a superconducting coil generating a static magnetic field; and a radiation shield surrounding the superconducting coil. In the static magnetic field magnet, at least a surface on a gradient coil side of the radiation shield includes a peripheral portion that forms multiple concavity and/or convexity. Further, In the static magnetic field magnet, a shape of a cross-section perpendicular to a depth direction of each of the multiple concavity and/or convexity formed by the peripheral portion is polygonal or circular. It is preferable that the peripheral portion is configured to form the multiple concavity and/or convexity in a straight line.

MRI apparatuses provided with one or more static magnetic field magnets according to the embodiments are roughly classified into a planar-open-magnet MRI apparatus and a cylindrical MRI apparatus. The planar-open-magnet MRI apparatus has tabular (i.e., flat-plate-shaped) static magnetic field magnets and tabular gradient coils and is configured to image an object such as a patient in an open space sandwiched between, for example, two tabular static magnetic field magnets.

The cylindrical MRI apparatus has a structure called a magnet unit or a gantry and forms a cylindrical space called a bore in the gantry. A patient lying on a table is transported into the bore and imaged inside the bore. Inside the gantry, a cylindrical static magnetic field magnet, a cylindrical gradient coil, and a cylindrical transmitting coil (for example, a WB (Whole Body) coil) are housed. That is, in the cylindrical MRI apparatus, each of the static magnetic field magnet, the gradient coil, and the transmitting coil has an approximately cylindrical shape.

In the case of the cylindrical MRI apparatus, the patient is exposed to noise for a long time in a narrow space inside the bore and forced to remain immobile during imaging. If the patient moves during imaging using the cylindrical MRI apparatus, an artifact may be included in the image, which may interfere with diagnosis. Further, in the case of the cylindrical MRI apparatus, it is difficult to perform imaging in a free posture, as exemplified by a case of imaging a patient with a curved spine. The planar-open-magnet MRI apparatus can solve such problems of the cylindrical MRI apparatus.

Among the MRI apparatuses according to the embodiments, the planar-open-magnet MRI apparatus will be described in the first embodiment, and the cylindrical MRI apparatus will be described in the second embodiment.

First Embodiment

Figure 1:
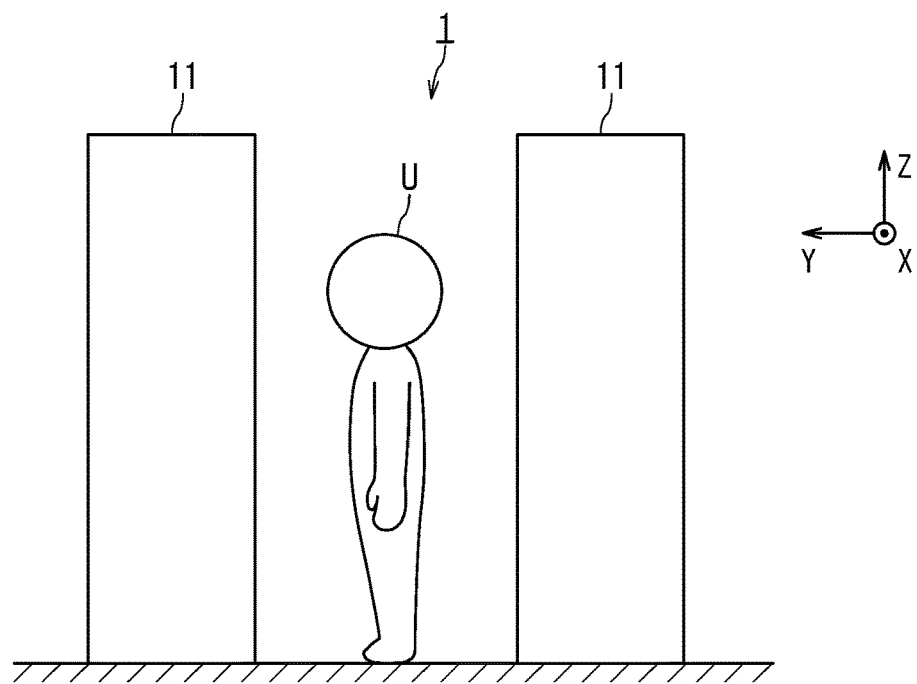
FIG. 1 is a diagram illustrating the first configuration example of an MRI apparatus according to the first embodiment.

FIG. 1 is a diagram illustrating the first configuration example (for a standing posture) of a planar-open-magnet MRI apparatus 1 according to the first embodiment, particularly focusing on arrangement of its static magnetic field magnets 11. As shown in FIG. 1, the MRI apparatus 1 includes two static magnetic field magnets 11 in the shape of circular plates (i.e., approximately thin cylinders), for example.

The static magnetic field magnets 11 are arranged such that the central axis of the static magnetic field magnets 11 (i.e., axis passing through the respective centers of both circular bottom surfaces of the approximately cylindrical shape) is parallel to the Y-axis direction defined as the anterior-posterior direction of an object such as a patient U. The X-axis direction is defined as the right-left direction of the patient U, and the Z-axis direction is defined as the head-foot direction of the patient U. Further, the two static magnetic field magnets 11 are arranged so as to sandwich the patient U.

Under such arrangement of the static magnetic field magnets 11, a magnetic field is generated in the free space between the two static magnetic field magnets 11. The patient U is imaged in this open space in a standing posture, for example.

When the static magnetic field magnets 11 are configured by using superconducting coils, the static magnetic field is generated by applying electric currents supplied from a static magnetic field power supply to the superconducting coils in an excitation mode. Afterward, when the static magnetic field magnets 11 shift to a persistent current mode, the static magnetic field power supply is disconnected and the static magnetic field magnets 11 continue to generate the static magnetic field of constant strength. The static magnetic field magnets can also be configured as permanent magnets.

Figure 2:
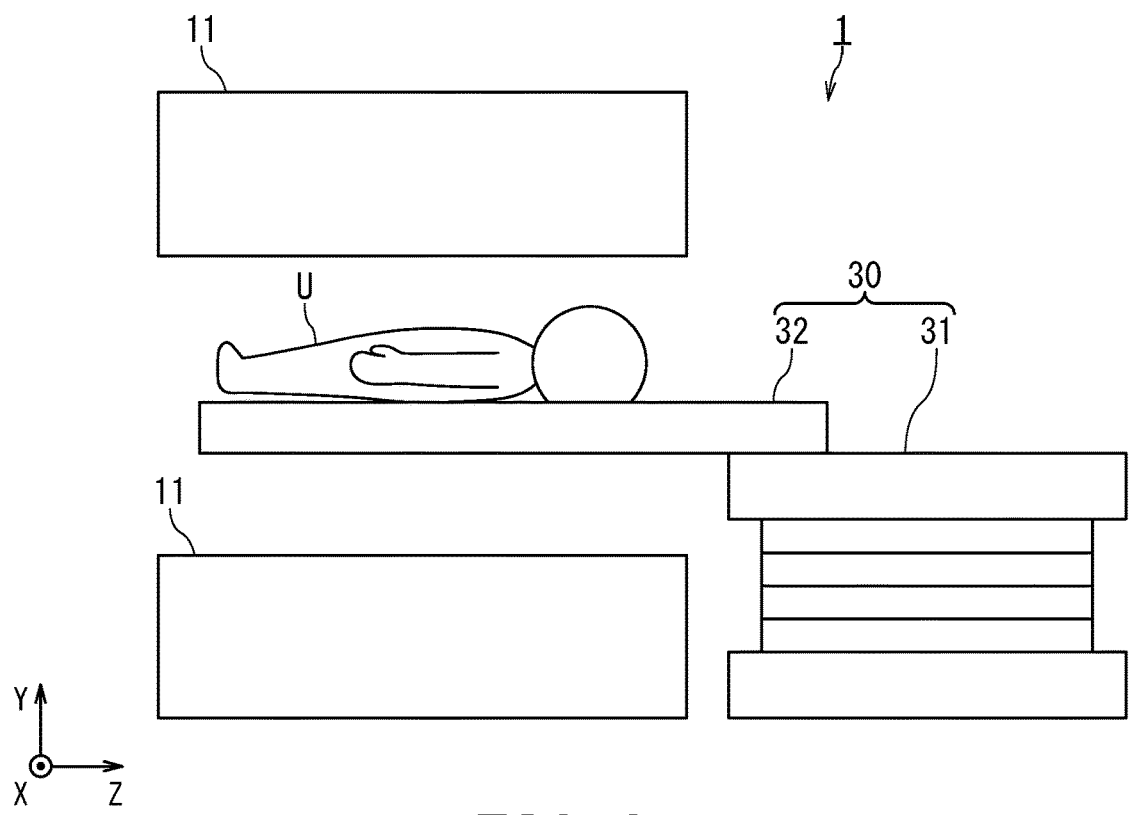
FIG. 2 is a diagram illustrating the second configuration example of the MRI apparatus according to the first embodiment.

FIG. 2 is a diagram illustrating the second configuration example (for a lying posture) of the MRI apparatus 1, particularly focusing on the arrangement of the static magnetic field magnets 11. FIG. 1 illustrates a configuration for imaging the patient U in the standing posture, and FIG. 2 illustrates a configuration for imaging the patient U lying on a bed table 32 extending from a bed body 31. This second configuration of the MRI apparatus 1 has a bed 30, which is different from FIG. 1.

The bed 30 includes the bed body 31 and the bed table 32. The bed body 31 can move the bed table 32 vertically and horizontally, and moves the patient U placed on the bed table 32 to a predetermined height before imaging. Then, during time of imaging, the bed table 32 is moved horizontally so as to move the patient U to an imaging region.

In the case of imaging the patient U in the lying posture, the static magnetic field magnets 11 are arranged such that their central axis matches the vertical direction as shown in FIG. 2. For example, one of the static magnetic field magnets 11 is disposed below the bed table 32 and the other static magnetic field magnet 11 is disposed above the bed table 32.

Figure 3B:
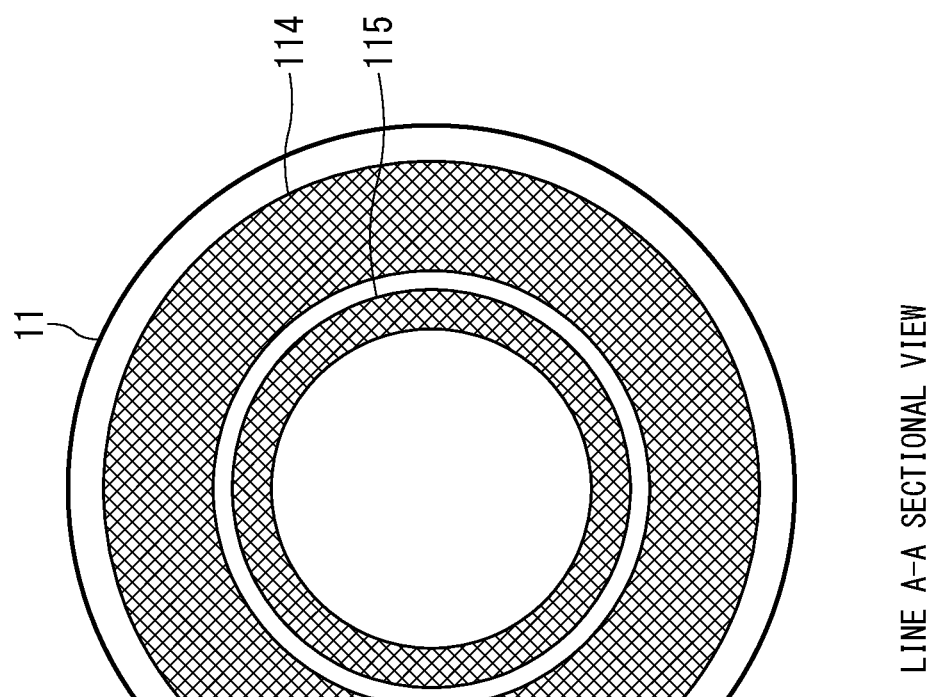
FIG. 3B is a diagram illustrating an internal configuration of a static magnetic field magnet provided in the MRI apparatus according to the first embodiment.
Figure 3A:
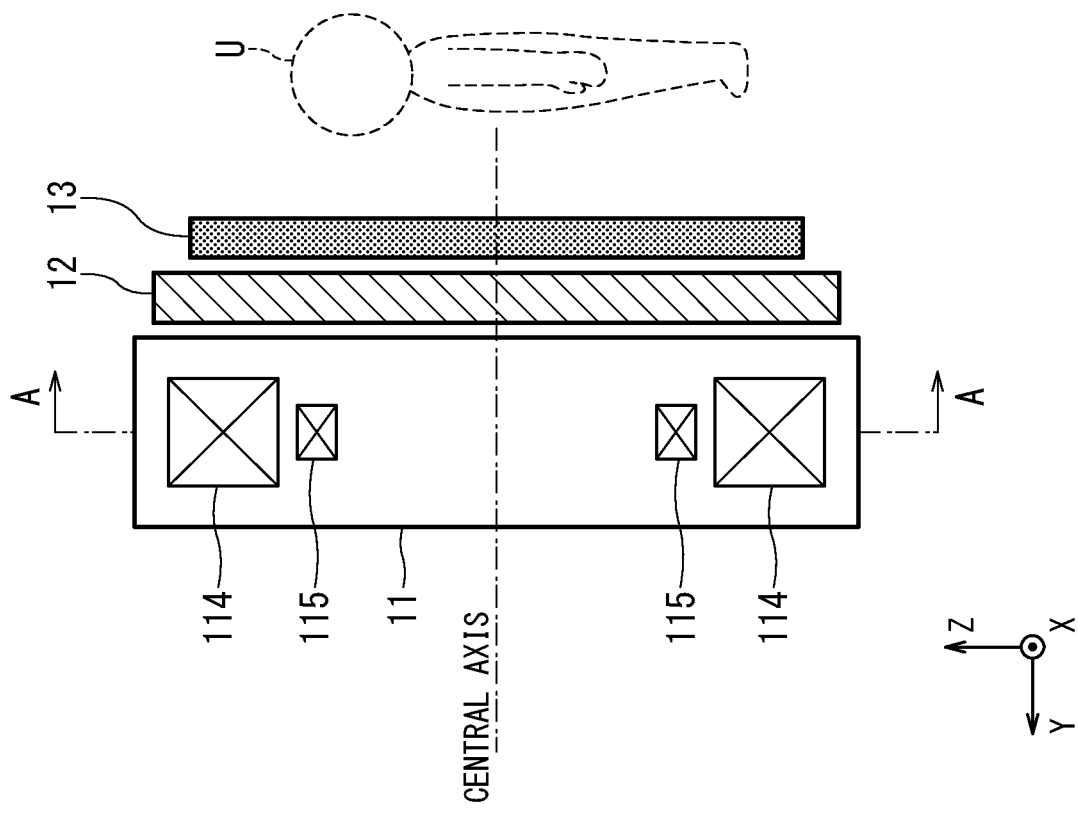

Each of FIG. 3A and FIG. 3B is a diagram illustrating an internal configuration of the static magnetic field magnet 11. FIG. 3A illustrates an internal cross-section of the static magnetic field magnet 11 as viewed from the direction orthogonal to its central axis. FIG. 3B illustrates an internal cross-section of the static magnetic field magnet 11 as viewed from the central axis direction, and is a cross-sectional view taken along the line A-A of FIG. 3A.

One of the two static magnetic field magnets 11 is placed in front of the patient U, and each static magnetic field magnet 11 includes one or more superconducting coils. The one or more superconducting coils are housed in, for example, a flat plate-shaped magnet housing having a predetermined thickness, i.e., a vacuum vessel 111 (shown in FIG. 5). In the case shown in FIG. 3A and FIG. 3B, inside the vacuum vessel 111, two circular superconducting coils 114 and 115 different in cross-sectional area from each other are accommodated, for example. The superconducting coils 114 and 115 generate the static magnetic field that determines the magnetic resonance frequency.

The MRI apparatus 1 includes two gradient coils 12 and two transmitting coils 13. The two gradient coils 12 are interposed between the two static magnetic field magnets 11 so as to be adjacent to the vacuum vessel 111, and generate a gradient magnetic field to be superimposed on the static magnetic field. The two transmitting coils 13 are interposed between the two gradient coils 12 and apply a high frequency pulse, i.e., an RF (Radio Frequency) pulse to the patient U. Each gradient coil 12 is configured as a flat plate-shaped coil, for example. Each transmitting coil 13 is also configured as a flat plate-shaped coil, for example.

Figure 4:
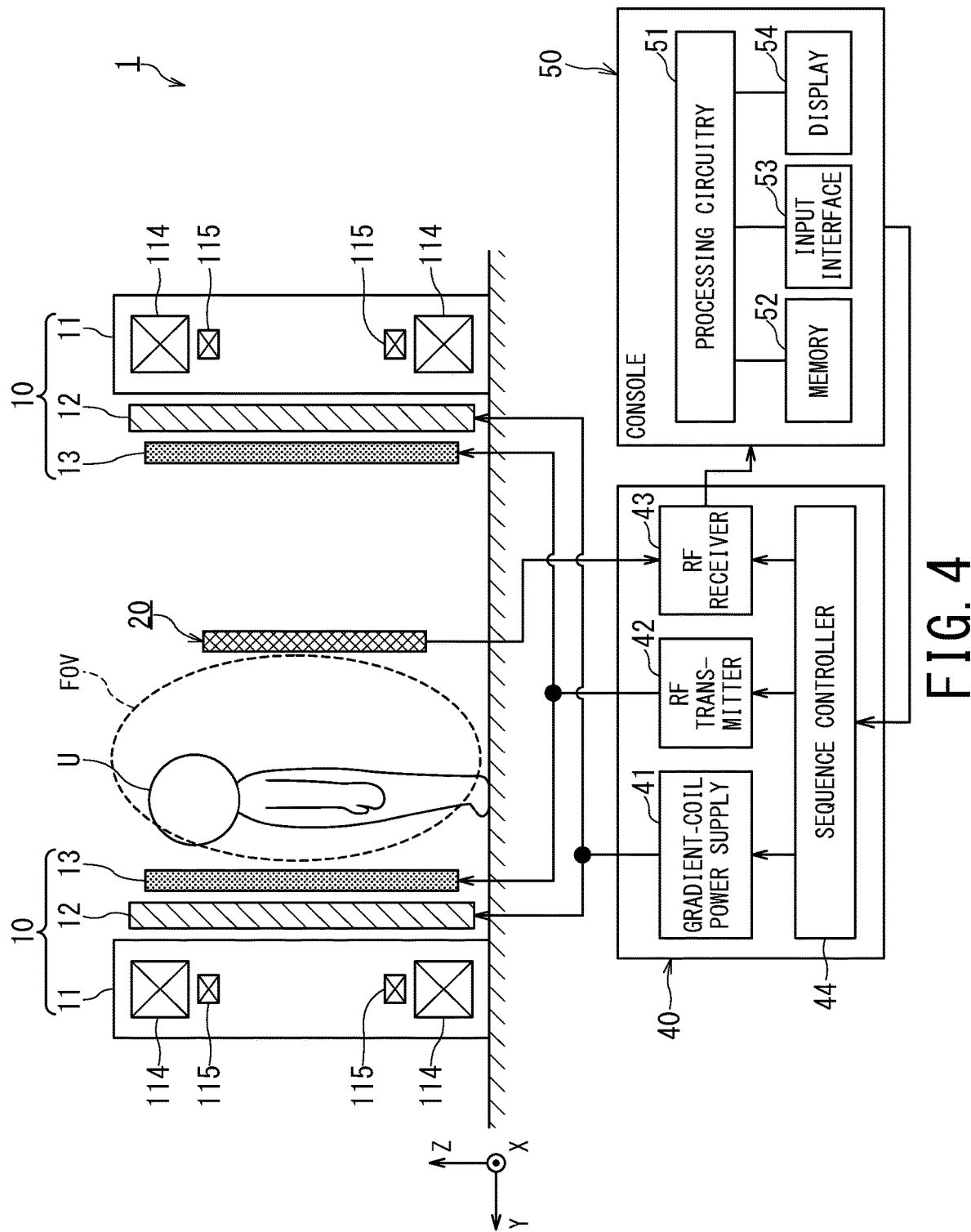
FIG. 4 is a block diagram illustrating a configuration example of the MRI apparatus according to the first embodiment.

FIG. 4 is a block diagram illustrating the second configuration of the MRI apparatus 1. This MRI apparatus 1 includes: two magnet units 10; a receiving coil 20; a control cabinet 40; and an image processing device (for example, a console) 50. The magnet units 10 and the receiving coil 20 are usually arranged in an examination room configured as a shield room. The control cabinet 40 is disposed in, for example, another room called a machine room. The console 50 is disposed in a control room. The second configuration (for the lying posture) of the MRI apparatus 1 is equivalent to the first configuration (for the standing posture) shown in FIG. 4 except the bed 30 shown in FIG. 2.

Each of the two magnet units 10 includes the static magnetic field magnet 11, the gradient coil 12, and the transmitting coil 13. The two magnet units 10 are arranged so as to face each other with the patient U interposed therebetween.

Each static magnetic field magnet 11 contains the superconducting coils 114 and 115 that are cooled down to cryogenic temperature by liquid helium. The static magnetic field magnets 11 generate the static magnetic field by applying electric currents supplied from the static magnetic field power supply (not shown) to the superconducting coils 114 and 115 in the excitation mode. Afterward, when the static magnetic field magnets 11 shift to the persistent current mode, the static magnetic field power supply is disconnected. Once shifting to the persistent current mode, the static magnetic field magnets 11 continue to generate the static magnetic field for a long time, for example, over one year.

The configuration of the static magnetic field magnets 11 will be described below by using FIG. 5 to FIG. 6B.

Each gradient coil 12 is installed on the inner side of the static magnetic field magnets 11. The two gradient coils 12 generate a gradient magnetic field by electric currents (power) supplied from the gradient-coil power supply 41 described below, and apply the gradient magnetic field to the patient U. Each gradient coil 12 includes: an X-channel coil configured to generate a gradient magnetic field in the X-axis direction; a Y-channel coil configured to generate a gradient magnetic field in the Y-axis direction; and a Z-channel coil configured to generate a gradient magnetic field in the Z-axis direction.

Since an eddy magnetic field, which is generated by an eddy current resulting from generation of the gradient magnetic field, interferes with imaging, an ASGC (Actively Shielded Gradient Coil) for the purpose of reducing the eddy current may be used for each gradient coil 12, for example.

The ASGC is a gradient coil in which shield coils for suppressing leakage magnetic fields are provided outside the main coils configured to generate the respective gradient magnetic fields in the orthogonal three-axis directions including the X-axis, Y-axis, and Z-axis directions.

The transmitting coils 13 are installed on the inner side of the gradient coils 12. The transmitting coils 13 transmit an RF pulse toward the patient U in accordance with the RF pulse signal transmitted from the RF transmitter 42 described below. When an excitation pulse transmitted from the transmitting coils 13 is applied to the patient U, an MR signal is emitted from the patient U in response to the application of this excitation pulse. This MR signal is received by the receiving coil 20. The receiving coil 20 is configured as, for example, a planar receiving antenna with a certain extent of area in two dimensions.

The receiving coil 20 is disposed at a position slightly away from the magnet unit 10 such that the patient U is interposed between the receiving coil 20 and the left magnet unit 10 as shown on the left side of the sheet of FIG. 4. An imaging space (or FOV (Field of View)) is formed between the left magnet unit 10 and the receiving coil 20. The receiving coil 20 may include multiple coil elements. A coil in which the multiple of these coil elements are arranged in an array is sometimes referred to as a PAC (Phased Array Coil).

Next, the control cabinet 40 will be described. The control cabinet 40 includes: a gradient-coil power supply 41 (for the X-axis, the Y-axis, and the Z-axis); an RF transmitter 42; an RF receiver 43; and a sequence controller 44.

The gradient-coil power supply 41 includes three gradient-magnetic-field power sources that correspond to the respective three channels and drive the gradient coils for generating the gradient magnetic fields in the X-axis, Y-axis, and Z-axis directions. The gradient-coil power supply 41 outputs necessary electric currents independently for each channel in accordance with an instruction from the sequence controller 44. As a result, the gradient coils 12 can apply the respective gradient magnetic fields in the X-axis, Y-axis, and Z-axis directions to the patient U.

The RF transmitter 42 generates an RF pulse signal on the basis of an instruction from the sequence controller 44. The RF transmitter 42 transmits the generated RF pulse signal to the transmitting coils 13.

The MR signals received by the receiving coil 20, more specifically, the MR signals received by the respective coil elements in the receiving coil 20 are transmitted to the RF receiver 43. The output line of each coil element is called a channel. Thus, the MR signal to be outputted from each coil element is sometimes called a channel signal.

The RF receiver 43 performs AD (Analog to Digital) conversion on the channel signals, i.e., on the MR signals, from the receiving coil 20, and outputs the converted MR signals to the sequence controller 44. The MR signals converted into digital signals are sometimes referred to as raw data.

The sequence controller 44 performs imaging of the patient U by driving the gradient-coil power supply 41, the RF transmitter 42, and the RF receiver 43 under the control of the console 50. When receiving the raw data from the RF receiver 43 by executing an imaging sequence, the sequence controller 44 transmits the raw data to the console 50.

Next, the console 50 will be described. The console 50 includes processing circuitry 51, a memory 52, an input interface 53, and a display 54.

The processing circuitry 51 may be configured as hardware such as a programmable logic device and an ASIC (Application Specific Integrated Circuit) or may be configured as a processor that executes predetermined programs or software. In the latter case, the processing circuitry 51 can be configured by including, for example, a special-purpose or general purpose CPU (Central Processing Unit) or MPU (Micro Processor Unit). Aspects of the programmable logic device include a circuit such as an SPLD (Simple Programmable Logic Device), a CPLD (Complex Programmable Logic Device), and an FPGA (Field Programmable Gate Array), for example. The processing circuitry 51 achieves the function of controlling the operation of the sequence controller 44 and performing imaging in accordance with the pulse sequence to generate MR images by reading in and executing the programs, which are stored in the memory 52 or directly incorporated into the processing circuitry 51.

The processing circuitry 51 may be configured with a single processing circuit element or may be configured by combining multiple independent processing circuit elements. In the latter case, multiple memories 52 may individually store the programs corresponding to the functions of the multiple independent processing circuit elements or a single memory 52 may collectively store the programs corresponding to the functions of all the processing circuit elements.

The memory 52 is composed of a semiconductor memory element such as a RAM (Random Access Memory) and a flash memory, a hard disk, and/or an optical disk, for example. The memory 52 may include a portable medium such as a USB (Universal Serial bus) memory and a DVD (Digital Video Disk). The memory 52 stores: various processing programs (including, for example, application programs and an operating system) to be executed by the processing circuitry 51; data necessary for executing the programs; and medical images. The operating system may also include a GUI (Graphic User Interface) that frequently uses graphics to display information on the display 54 for the user and allows basic operations to be performed via the input interface 53.

The input interface 53 includes: an input device that can be operated by a user; and an input circuit to which signals from the input device are inputted. The input device is achieved by: a track ball; a switch; a mouse; a keyboard; a touch pad by which input operation is achieved by touching its operation screen; a touch screen in which the display screen and the touch pad are integrated; a non-contact input device using an optical sensor; and/or a voice input circuit, for example. When the input device is operated by a user, the input circuit generates an electric signal based on the input operation and outputs the electric signal to the processing circuitry 51.

The display 54 is composed of a general display output device such as a liquid crystal display and an OLED (Organic Light Emitting Diode) display. The display 54 displays various information items under the control of processing circuitry 51.

Under the control of the processing circuitry 51, the console 50 fills k-space (i.e., frequency space) with the raw data transmitted from the sequence controller 44, and stores the obtained k-space data in the memory 52. Under the control of the processing circuitry 51, the console 50 generates a desired MR image depicting the inside of the patient U by performing reconstruction processing such as inverse Fourier transform on the k-space data stored in the memory 52. Further, the console 50 stores various generated MR images in the memory 52 under the control of the processing circuitry 51.

Next, the configuration of the static magnetic field magnets 11 will be described by using FIG. 5 to FIG. 6B.

Figure 5:
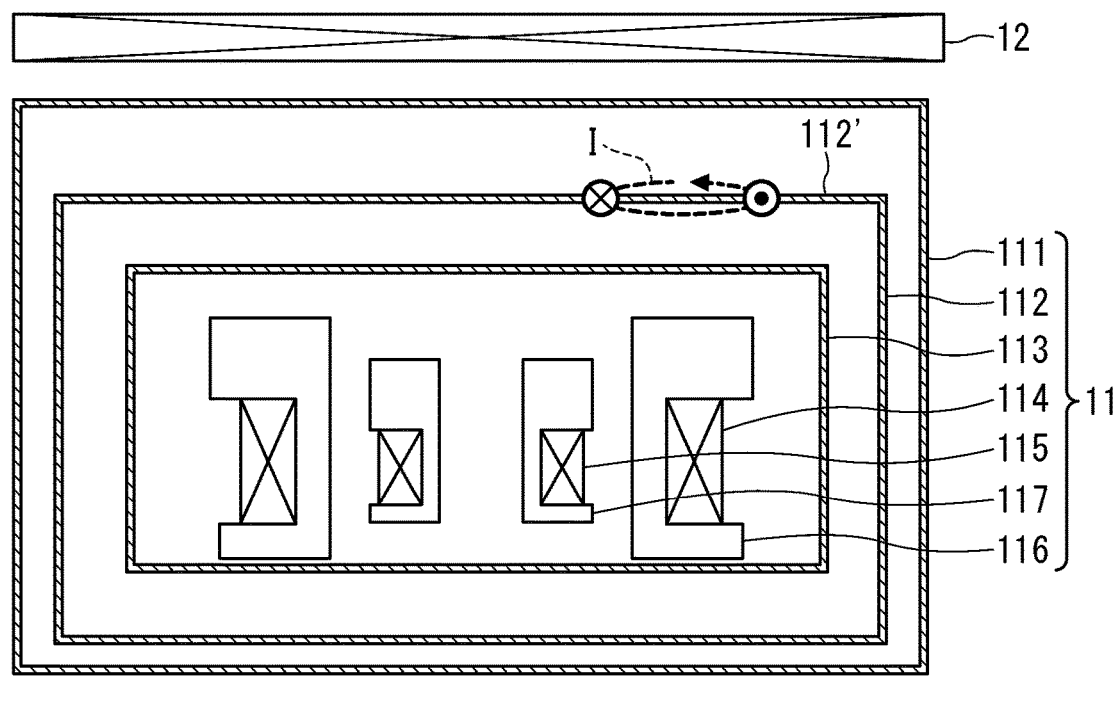
FIG. 5 is a cross-sectional view illustrating a configuration of the static magnetic field magnet and the gradient coil both provided in the MRI apparatus according to the first embodiment.

FIG. 5 is a cross-sectional view illustrating the configuration of each static magnetic field magnet 11 and each gradient coil 12. As shown in FIG. 5, each static magnetic field magnet 11 is accommodated in the vacuum vessel 111 having an approximately cylindrical shape in which the axis passing through the respective centers of both circular bottom surfaces is parallel to the Y-axis. Each static magnetic field magnet 11 includes: a radiation shield 112; a helium vessel 113; the superconducting coils 114 and 115; and winding frames 116 and 117.

The radiation shield 112 has an approximately cylindrical shape in which the axis passing through the respective centers of both circular bottom surfaces is parallel to the Y-axis, similarly to the vacuum vessel 111. The radiation shield 112 is provided inside the vacuum vessel 111 so as to surround the helium vessel 113 (i.e., the superconducting coils 114 and 115). The above-described approximately cylindrical shape refers to not only a strictly precise cylindrical shape but also a shape with deformation that is generated at the time of manufacturing the cylindrical radiation shield 112. For example, a shape with deformation includes distortion, an uneven surface, and/or a polygonal concavity that are generated on the surfaces during presswork of the radiation shield 112.

The helium vessel 113 has an approximately cylindrical shape in which the axis passing through the respective centers of both circular bottom surfaces is parallel to the Y-axis, similarly to the vacuum vessel 111. The helium vessel 113 is provided inside the radiation shield 112, and holds the liquid helium. The superconducting coils 114 and 115 are provided inside the helium vessel 113 and generate the static magnetic field. The superconducting coil 114 is disposed on and wound around by the winding frame 116 while the superconducting coil 115 is disposed on and wound around by the winding frame 117 such that the winding frames 116 and 117 fix and hold the superconducting coils 114 and 115. The static magnetic field magnets 11 are provided with a refrigerator (not shown) for cooling down the liquid helium to cryogenic temperature. Additionally, the static magnetic field magnets 11 may be configured as permanent magnets. Hereinbelow, a description will be given of the case where the static magnetic field magnets 11 have the superconducting coils 114 and 115.

The radiation shield 112 is disposed between the vacuum vessel 111 and the helium vessel 113, and is cooled by the refrigerator (not shown) so as to achieve the function of reducing the evaporation amount of the liquid helium in the helium vessel 113 caused by radiation. In order to provide the radiation shield 112 with such a function, a non-magnetic metal material with high heat transfer performance is used for the radiation shield 112 in general. Such a metal material has characteristics of high electrical conductivity (i.e., high electrical conductance).

Hence, due to the gradient-coil induced heating (GCIH) caused by the operation of each gradient coil 12, on the bottom surface 112' of the radiation shield 112, a large eddy current I and a sum of Lorentz forces (i.e., electromagnetic forces) acting in the radial direction and axial direction are generated. Thus, when the strength of the radiation shield 112 is insufficient, there is a possibility that the radiation shield 112 is damaged. Even if the radiation shield 112 is not damaged, in the case of the radiation shield 112 without satisfactory rigidity, such a radiation shield 112 may vibrate due to the electromagnetic force caused by the eddy current I, and may consequently be deformed. In some cases, the deformed radiation shield 112 contacts the outer vacuum vessel 111 or the inner helium vessel 113, which increases the amount of the heat entering the helium vessel 113. In such a case, the evaporation amount of the liquid helium in the helium vessel 113 may increase. When the rigidity of the radiation shield 112 is low, the radiation shield 112 may vibrate due to the influence of the surroundings, which may affect the adjustment of the eddy current.

Figure 6A:
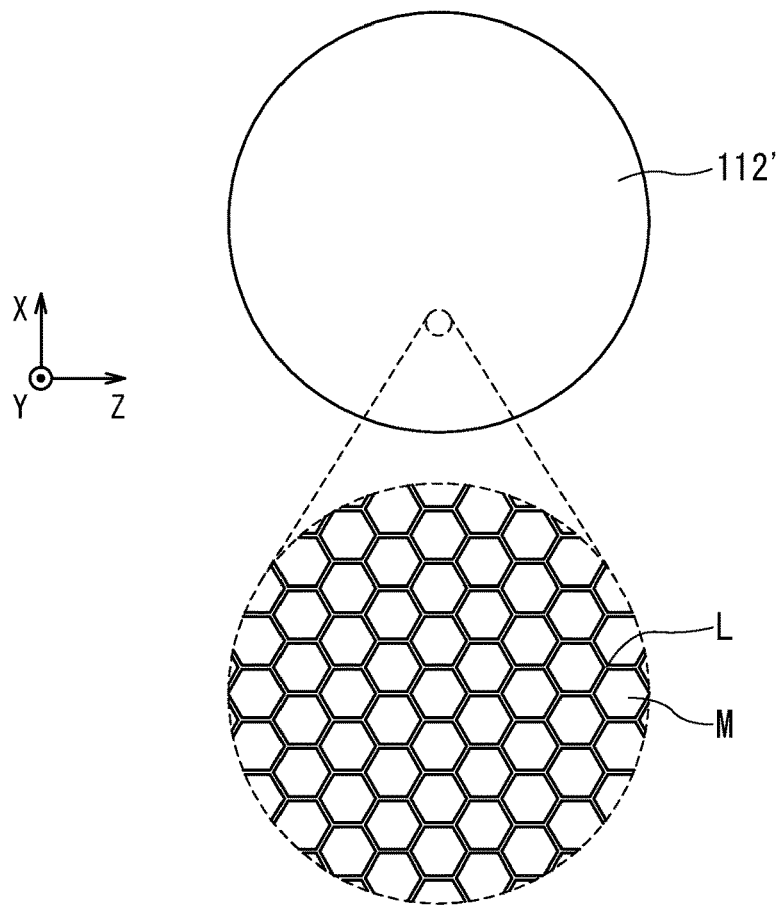
FIG. 6B is a diagram illustrating a configuration example of a surface on the gradient coil side of the radiation shield provided in the MRI apparatus according to the first embodiment.
Figure 6B:
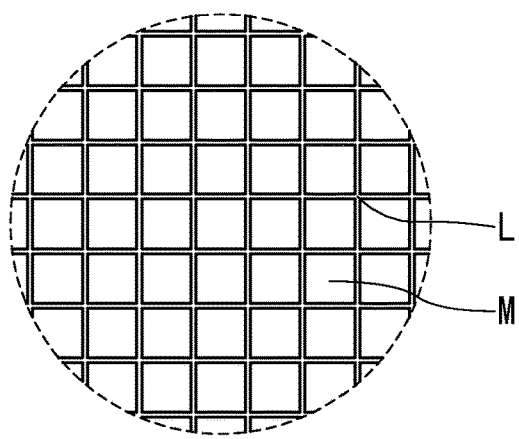

Accordingly, among all the surfaces, including the two flat circular bottom surfaces and one cylindrical side surface, of the approximately cylindrical radiation shield 112, the bottom surface 112' on the side of the gradient coil 12 has peripheral portions L that form multiple concavity and/or convexity M shown in FIG. 6A and FIG. 6B. The multiple concavity and/or convexity M are hereinafter referred to as concavities M. Since it is preferable that the multiple concavities M be formed in a straight line, they are shown in the straight line. Each concavity M may be a non-through hole or a through hole. In terms of the radiation shielding function of the radiation shield 112, each concavity M is preferably a non-through hole rather than a through hole. However, as described below, when a metal material of an aluminum alloy or a copper alloy molded into the shape of the concavities M is fitted into or interdigitated with the concavities M, the shield function can be sufficiently secured even each concavity M is formed into a through hole. Thus, aspects of the embodiments do not exclude the case where the concavities M are through holes.

In the following description, a cross-section perpendicular to the depth direction of the concavity(es) M is referred to as the perpendicular cross-section of the concavity(es) M. The shape of the perpendicular cross-section of each concavity M formed by the peripheral portions L is polygonal or circular. This shape can improve the strength and rigidity of the radiation shield 112. The radiation shield 112 being provided with two flat circular bottom surfaces and one cylindrical side surface can may have different structures for each surface. For example, the radiation shield 112 can be made in a manner where only the bottom surface 112' on the side of the gradient coil 12 has the above-described structure in which the perpendicular cross-section of each concavity M is polygonal or circular. Additionally or alternatively, all of the two circular bottom surfaces and one cylindrical side surface of the radiation shield 112 may have the above-described structure in which the perpendicular cross-section of each concavity M is polygonal or circular.

When the shape of the cross-section perpendicular to the depth direction is polygonal, each concavity M in this perpendicular cross-section has, for example, an approximately regular polygonal shape (i.e., approximately regular polygonal prism shape when viewed three-dimensionally). For example, in the perpendicular cross-section (i.e., the X-Z cross-section) of the bottom surface 112' shown in FIG. 6A, each concavity M of the bottom surface 112' has an approximately regular hexagonal shape (i.e., approximately regular hexagonal prism shape when viewed three-dimensionally). The approximate hexagon of the perpendicular cross-section includes a strictly regular hexagon (i.e., honeycomb structure) as well as a shape with deformation that is generated at the time of manufacturing the radiation shield 112. For example, shapes with deformation include polygonal concavities, concave and convex surfaces, and/or distortion that are generated at the peripheral portions L during presswork of the radiation shield 112. The perpendicular cross-section of each concavity M is not limited to an approximately regular hexagon, and may be an approximately regular quadrangle (i.e., an approximately regular quadrangular prism shape when viewed three-dimensionally) as shown in FIG. 6B. In terms of strength and rigidity of the radiation shield 112, it is preferred that the perpendicular cross-section of each concavity M is an approximately regular hexagon rather than an approximately regular quadrangle.

When the shape of the cross-section perpendicular to the depth direction of each concavity M is circular (i.e., approximately cylindrical or approximately spherical when viewed three-dimensionally), this shape includes polygonal concavities, concave and convex surfaces, and/or distortion that are generated at the peripheral portions L during presswork of the radiation shield 112, similarly to the polygonal case.

In addition, it is preferred that the metal material of the peripheral portions L forming each concavity M is made of a non-magnetic material such as an aluminum alloy and a copper alloy with high heat transfer performance. Since the aluminum alloy and the copper alloy have high conductivity, an eddy current with a long time constant can be generated in the radiation shield 112, and thus, a shielding effect against a leakage magnetic field can be expected. Although each concavity M may be hollow, it is preferred that the concavities M are fitted or interdigitated with a metal material such as an aluminum alloy and a copper alloy molded into the shape of the concavities M. In this preferred structure, the radiation shield 112 can be maintained in a non-magnetic state with high heat transfer performance.

The MRI apparatus 1 described in FIG. 1 to FIG. 6B is a double-sided apparatus in which the static magnetic field magnets 11 are provided on both sides interposing the patient U. However, the MRI apparatus 1 is not limited to the double-sided aspect. For example, the MRI apparatus 1 may be a single-sided apparatus in which the static magnetic field magnet 11 is provided only on one of two sides interposing the patient U (for example, only the static magnetic field magnet 11 in front of the patient U in FIG. 4 is provided and the other magnet 11 is omitted). In that case, in the static magnetic field magnet 11 provided only on one side, at least the surface 112' on the gradient coil side of the radiation shield 112 is provided with multiple concavities arranged without gaps and has a structure in which the cross-section perpendicular to the depth direction of each concavity is polygonal.

According to the static magnetic field magnets 11 and the MRI apparatus 1 described above, the strength and rigidity of the radiation shield 112 is improved, thus, damage to the radiation shield 112 can be suppressed, and consequently, the evaporation amount of the liquid helium can reduced. Further, the influence on adjustment of the eddy current can be suppressed by improving the rigidity of the radiation shield 112.

Second Embodiment

Figure 7:
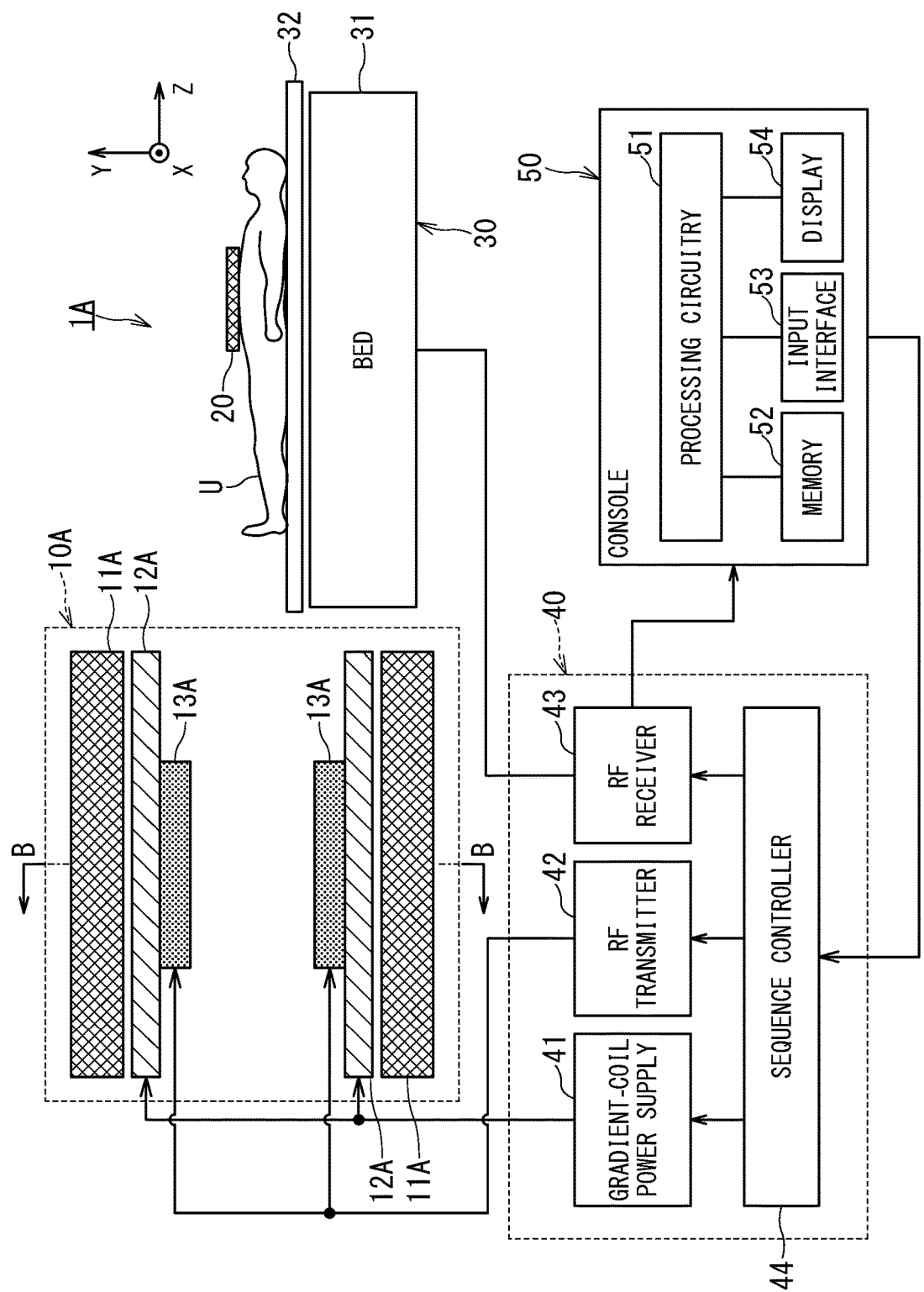
FIG. 7 is a block diagram illustrating a configuration example of an MRI apparatus according to the second embodiment.

FIG. 7 is a block diagram illustrating a configuration example of a cylindrical MRI apparatus 1A according to the second embodiment. In FIG. 7, the same reference signs are given to the same components as those in FIG. 4, and duplicate description is omitted. The MRI apparatus 1A includes: a magnet unit 10A; the receiving coil 20; the bed 30; the control cabinet 40; and the console 50. The magnet unit 10A and the receiving coil 20 are usually placed in the examination room configured as the shield room.

Figure 8:
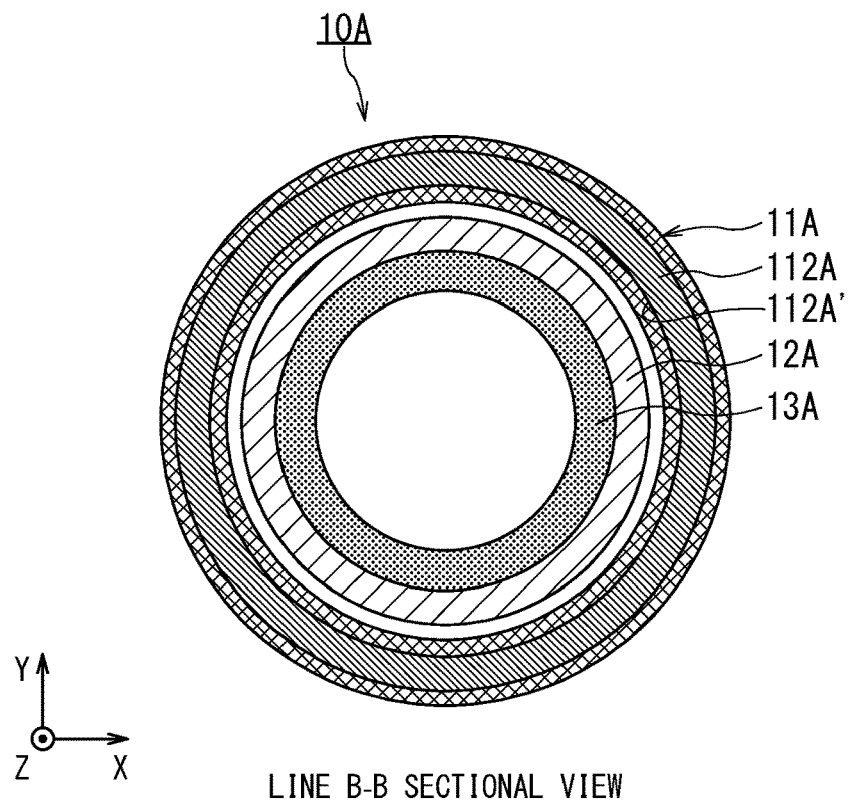
FIG. 8 is a cross-sectional view illustrating a configuration of a magnet unit provided in the MRI apparatus according to the second embodiment.

The magnet unit 10A include: a static magnetic field magnet 11A; a gradient coil 12A; and a transmitting coil (for example, a WB (Whole Body) coil) 13A. The static magnetic field magnet 11A, the gradient coil 12A, and the transmitting coil 13A are equivalent to the static magnetic field magnet 11, the gradient coil 12, and the transmitting coil 13 shown in FIG. 4 except for their approximately cylindrical shape. FIG. 8 is a cross-sectional view of the magnet unit 10A taken along the line B-B in FIG. 7.

As shown in FIG. 8, the magnet unit 10A includes the static magnetic field magnet 11A, the gradient coil 12A, and the transmitting coil 13A that are coaxially arranged in this order from the outer side. The static magnetic field magnet 11A is housed in an approximately cylindrical vacuum vessel (not shown), axis of which is parallel to the Z-axis. The static magnetic field magnet 11A includes: a radiation shield 112A; a helium vessel (not shown); a superconducting coil (not shown); and a winding frame (not shown).

The radiation shield 112A has an approximately cylindrical shape, axis of which is parallel to the Z-axis similarly to the vacuum vessel, and is provided inside the vacuum vessel. Of all the surfaces of the cylindrical radiation shield 112A, the surface 112A' on the side of the gradient coil 12A (i.e., the inner circumferential surface on the side of the gradient coil 12A in this case) has peripheral portions that form multiple concavities without gaps. The shape of the cross-section perpendicular to the depth direction of each of the concavities formed by the peripheral portions is polygonal. This structure improves the strength and rigidity of the radiation shield 112A. The radiation shield 112A, which is approximately cylindrical, has two ring-shaped bottom surfaces, the inner circumferential surface, and the outer circumferential surface, and may have different structure for each surface. For example, the radiation shield 112A can be made in a manner where only the inner circumferential surface 112A' on the side of the gradient coil 12 has a structure in which the perpendicular cross-section of each concavity is polygonal. Additionally or alternatively, all of the two bottom surfaces, the inner circumferential surface, and the outer circumferential surface of the radiation shield 112A may have the above-described structure in which the perpendicular cross-section of each concavity is polygonal.

Figure 9:
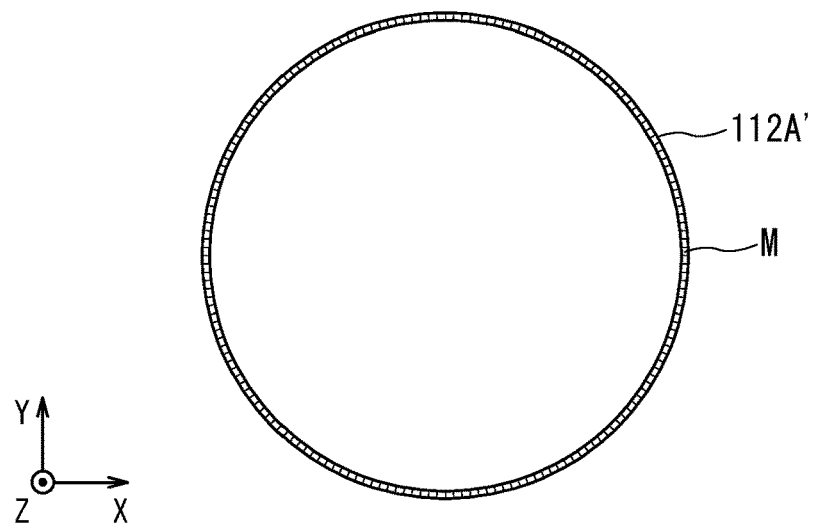
FIG. 9 is a cross-sectional view illustrating the radiation shield provided in the MRI apparatus according to the second embodiment.

For example, at the perpendicular cross-section of the bottom surface 112A', each concavity of the bottom surface 112A' has an approximately regular hexagonal shape. In other words, the cross-section perpendicular to the depth direction (i.e., the radial direction of the bottom surface 112A') of each concavity M of the surface 112A' shown in FIG. 9 is an approximately regular hexagon shown in the lower part of FIG. 6A. The shape of the perpendicular cross-section of the concavity M is not limited to an approximately regular hexagon, and may be an approximately regular quadrangle as shown in FIG. 6B. Note that FIG. 9 illustrates the case where each concavity M is a through hole.

Also in the case of the surface 112A' of the radiation shield, it is preferred that the peripheral portions L forming each concavity M are made of a metal material such as an aluminum alloy and a copper alloy, and it is preferred that each concavity M is fitted or interdigitated with a metal material such as an aluminum alloy and a copper alloy molded into the shape of each concavity M, similarly to the surface 112' of the radiation shield in FIG. 6A and FIG. 6B.

According to the static magnetic field magnet 11A and the MRI apparatus TA described above, the strength and rigidity of the radiation shield 112A is improved, thus, damage to the radiation shield 112A can be suppressed, and consequently, the evaporation amount of the liquid helium can be reduced. Further, the influence on adjustment of the eddy current can be suppressed by improving the rigidity of the radiation shield 112A.

According to at least one embodiment described above, damage to the radiation shield can be suppressed, and the evaporation amount of the liquid helium in the helium vessel can be reduced.

While certain embodiments have been described, these embodiments have been presented by way of example only, and are not intended to limit the scope of the inventions. Indeed, the novel methods and systems described herein may be embodied in a variety of other forms; furthermore, various omissions, substitutions, changes, and combinations of embodiments in the form of the methods and systems described herein may be made without departing from the spirit of the inventions. The accompanying claims and their equivalents are intended to cover such forms or modifications as would fall within the scope and spirit of the inventions.

What is claimed is:

1. A static magnetic field magnet, comprising:
a superconducting coil generating a static magnetic field; and
a radiation shield surrounding the superconducting coil, wherein
at least a surface on a gradient coil side of the radiation shield includes a peripheral portion that forms multiple concavities arranged without any gaps therebetween in a two-dimensional plane, and
a shape of a cross-section perpendicular to a depth direction of each of the multiple concavities formed by the peripheral portion is polygonal or circular.

2. The static magnetic field magnet according to claim 1, wherein the peripheral portion is configured to form the multiple concavities in a straight line.

3. The static magnetic field magnet according to claim 1, wherein the cross-section of each of the multiple concavities formed by the peripheral portion is polygonal.

4. The static magnetic field magnet according to claim 1, wherein a metal material of the peripheral portion is composed of an aluminum alloy or a copper alloy.

5. The static magnetic field magnet according to claim 4, wherein the multiple concavities formed by the peripheral portion are fitted with a metal material of the aluminum alloy or the copper alloy molded into a shape of the multiple concavities.

6. An MRI apparatus comprising:
the static magnetic field magnet according to claim 1;
a gradient coil configured to generate a gradient magnetic field; and
a transmitting coil configured to transmit an RF pulse.

7. The MRI apparatus according to claim 6, wherein
each of the static magnetic field magnet, the gradient coil, and the radiation shield has an approximately cylindrical shape, and
at least a surface on a side of the gradient coil of the radiation shield is a bottom surface.

8. The MRI apparatus according to claim 6, wherein
each of the static magnetic field magnet, the gradient coil, and the radiation shield has an approximately cylindrical shape, and
at least a surface on a side of the gradient coil of the radiation shield is an inner circumferential surface.

9. The MRI apparatus according to claim 6, wherein the gradient coil comprises:
a main coil configured to generate respective gradient magnetic fields in orthogonal three-axis directions; and
a shield coil disposed outside the main coil.

10. A static magnetic field magnet, comprising:
a superconducting coil generating a static magnetic field; and
a radiation shield surrounding the superconducting coil, wherein
at least a surface on a gradient coil side of the radiation shield includes a peripheral portion that forms multiple concavities,
a shape of a cross-section perpendicular to a depth direction of each of the multiple concavities formed by the peripheral portion is polygonal or circular, and
the cross-section of each of the multiple concavities formed by the peripheral portion is an approximately regular hexagon.

* * * * *